(12) United States Patent
Giudici

(10) Patent No.: US 11,772,835 B2
(45) Date of Patent: Oct. 3, 2023

(54) PLANT FOR PACKAGING CAPSULES

(71) Applicant: OMAS TECNOSISTEMI S.P.A., Cerro Maggiore (IT)

(72) Inventor: Savino Giudici, Lainate (IT)

(73) Assignee: OMAS TECNOSISTEMI S.P.A., Cerro Maggiore (IT)

(*) Notice: Subject to any disclaimer, the term of this patent is extended or adjusted under 35 U.S.C. 154(b) by 423 days.

(21) Appl. No.: 17/281,030

(22) PCT Filed: Sep. 26, 2019

(86) PCT No.: PCT/IB2019/058156
§ 371 (c)(1),
(2) Date: Mar. 29, 2021

(87) PCT Pub. No.: WO2020/070592
PCT Pub. Date: Apr. 9, 2020

(65) Prior Publication Data
US 2021/0347509 A1 Nov. 11, 2021

(30) Foreign Application Priority Data
Oct. 5, 2018 (IT) .................. 102018000009195

(51) Int. Cl.
*B65B 43/44* (2006.01)
*B65B 43/46* (2006.01)
(Continued)

(52) U.S. Cl.
CPC .............. *B65B 43/44* (2013.01); *B65B 7/164* (2013.01); *B65B 43/46* (2013.01); *B65B 59/00* (2013.01); *B65G 25/02* (2013.01)

(58) Field of Classification Search
CPC ......... B65B 43/44; B65B 7/164; B65B 43/46; B65B 59/00; B65G 25/02
(Continued)

(56) References Cited

U.S. PATENT DOCUMENTS 3,017,010 A * 1/1962 Wiggins .................. B65G 25/02
198/429

FOREIGN PATENT DOCUMENTS

| GB | 2179016 A | 2/1987 |
| GB | 2281893 A | 3/1995 |
| WO | 201103979 A2 | 7/2011 |

OTHER PUBLICATIONS

Yuan, Stepping Conveyor, CN 108455191 A (Year: 2018).*
(Continued)

*Primary Examiner* — Gene O Crawford
*Assistant Examiner* — Lester Rushin, III
(74) *Attorney, Agent, or Firm* — Browdy and Neimark, PLLC

(57) ABSTRACT

A plant for packaging capsules comprising a main frame (20) on which is positioned a system for moving capsules (30) to make one or more capsules (12) advance along a first predetermined axial direction (A-A) from an inlet (22) to an outlet (24). The plant comprises a plurality of operating stations (200, 201, 203) for packaging a substance into a plurality of capsules (12), wherein the system for moving capsules (30) comprises a movement device that comprises a pair of sliding profiles (36) that extend along said first predetermined axial direction (A-A) and are connected to the main frame (20), a first movable frame (87, 88, 89) movable in transverse direction with respect to the first predetermined axial direction (A-A), a driving member mounted slidable on an upper movable beam (88) of the first movable frame (87, 88, 89) along said predetermined axial direction (A-A) and positioned between the pair of sliding profiles (36). Said driving member comprises a plurality of drive pins (212) particularly suited to drive a capsule transport support (100) containing said one or more capsules (12).

11 Claims, 12 Drawing Sheets

(51) Int. Cl.
*B65B 59/00* (2006.01)
*B65G 25/02* (2006.01)
*B65B 7/16* (2006.01)

(58) Field of Classification Search
USPC .............................................. 198/804, 346.3
See application file for complete search history.

(56) References Cited

OTHER PUBLICATIONS

Vine, Gripper assembly for tray Sealing Machine, WO 2007107703 A1 (Year: 2007).*
System for Transporting Containers, Particularly Suitable for Use in Production Plants for Paints, Varnishes, Etc., JP 2003522700 A (Year: 2003).*
Wilkes, Conveyors, GB 1560752 A (Year: 1980).*

* cited by examiner

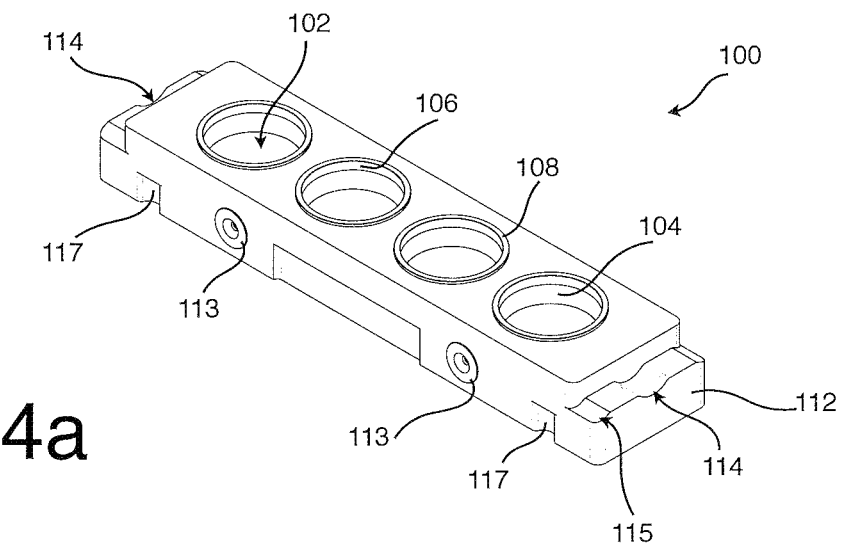
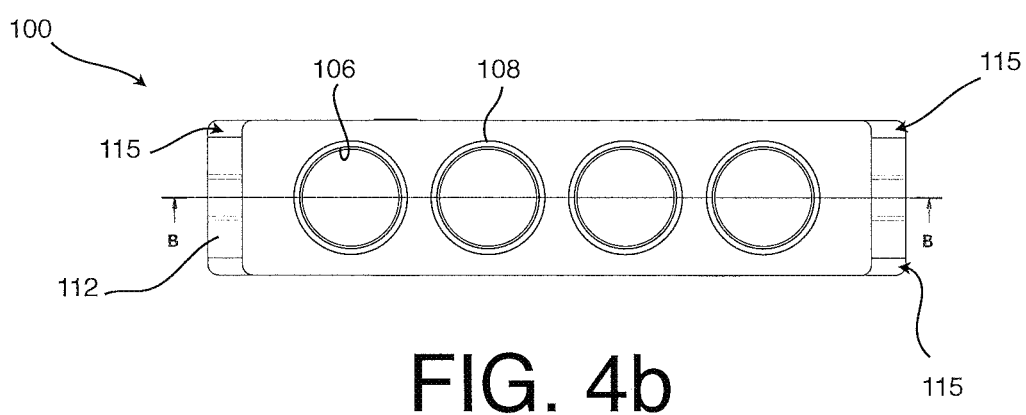
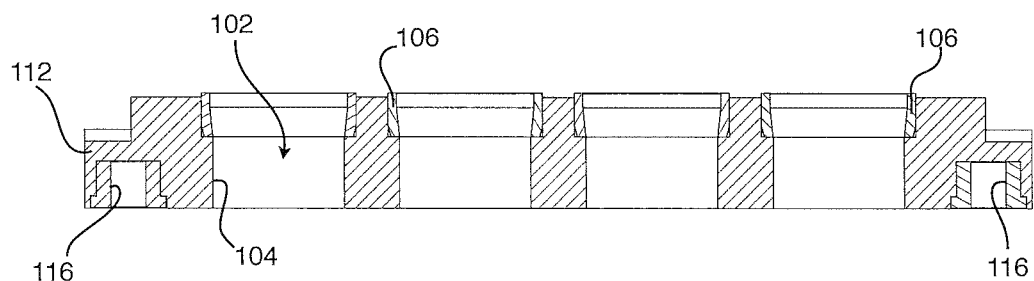

PLANT FOR PACKAGING CAPSULES

TECHNICAL FIELD

The present invention relates to the sector of automatic plants for packaging a product inside a capsule, and it was developed with particular regard, although without limitation, to a plant for packaging capsules.

It should be specified that the term "capsule" herein means any container, of any shape and made of any material, able to contain within it a substance in solid or liquid form, granular or pasty, of a food nature or not. The present invention was developed, preferably, although without limitation, for a capsule made of plastic material, shaped as a cup and defined by a lateral wall, by a bottom wall and by an opposite opening particularly adapted to be closed by means of a covering element engaged to the capsule itself.

It should be further specified that the term "packaging" herein means all operations necessary to provide a physical protection to a substance, and, for example, the operations of dosing and weighing a substance inside a capsule, and the operations necessary for closing said capsule.

BACKGROUND ART

Known plants for packaging a product inside a container usually comprise a conveyor in which the containers are conveyed through a succession of operating stations.

Conveyors are usually dimensioned so as to be able to convey containers with a specific format and dimension. In the cosmetics industry, where containers have a less stable base, containers are inserted on a support with a flat base so as to assure the stability of the container on the conveyor. In this case, too, each support is particularly suited to support a container with a specific format and dimension.

Numerous tests have shown that setting up containers on the supports slows down the initial set-up operations of the machine to a considerable extent, affecting its daily productivity. For example, in a known set-up the supports are fastened to the transport system by means of mechanical fixing and/or anchoring elements, screws, hooks, etc. In this way, every set-up operation obligates operators to use suitable mechanical equipment to disassemble and reassemble said supports and to prolong machine set-up times.

Moreover, in the cases in which production comprises moving and packaging containers with different formats and dimensions, said slow-down is even more evident, inasmuch as known systems have rigid limitations.

Moreover, known systems for packaging are often tied to the type of substance placed inside the containers, so that systems for filling containers with liquid substances are not compatible for filling containers or powders or lyophilized substances.

Therefore, the need has emerged to obtain an extremely flexible system for packaging containers, able to manage easily and rapidly containers with different formats and sizes, filled with liquid, pulverized and/or lyophilized substances, without impacting the average productivity of the productive unit.

An object of the present invention is to meet this need.

This object is achieved by the features of the invention set forth in independent claim 1. The dependent claims outline preferred and/or particularly advantageous aspects of the invention.

DESCRIPTION OF THE INVENTION

An aspect of the solution in accordance with the present invention makes available a plant for packaging capsules comprising a main frame on which is positioned a system for moving capsules to make one or more capsules advance along a first predetermined axial direction from an inlet to an outlet of the system for moving the capsules, characterised in that the system for moving capsules comprises a movement device comprising:

- a pair of sliding profiles that extend along said first predetermined axial direction and are connected to the main frame,
- a first movable frame movable in transverse direction with respect to the first predetermined axial direction,
- a driving member mounted slidable on an upper movable beam of the first movable frame along said predetermined axial direction and positioned between the pair of sliding profiles,
- said first movable frame comprising a plurality of drive pins particularly suited to drive a capsule transport support containing said one or more capsules.

Thanks to this solution it is possible to translate the capsules along a predetermined direction with a fixed pitch and at constant time intervals so as to allow the operating stations to package the capsules with precision.

According to another aspect of the present invention, the system for moving capsules comprises a centring device that comprises a lower centring assembly connected to a second movable frame movable in transverse direction with respect to the first predetermined axial direction, and an upper centring assembly connected to the sliding profiles.

Thanks to this solution, it is possible to assure a high precision of position and stability of the containers with respect to the operating stations so as to optimise the steps for packaging capsules.

According to another aspect of the present invention, the lower centring assembly comprises a plurality of centring pins connected to an upper centring beam of the second movable frame, such centring pins being particularly suited to be inserted in centring sleeves of a capsule transport support.

According to another aspect of the present invention, the upper centring assembly comprises a plurality of upper centring abutments connected to the sliding profiles, particularly suited to abut against a centring seat of a capsule transport support.

Thanks to this solution, it is possible to fasten, and to maintain stable, the capsule transport support between the centring pins and the upper abutment.

According to another aspect of the present invention, the second movable frame of the centring device and the first movable frame of the movement device are both mounted in opposition on a main driveshaft through a respective cam and a respective connecting rod.

Thanks to this solution, it is possible to reduce the number of actuators inside the system, reducing its bulk and costs.

According to another aspect of the present invention, the system for moving capsules comprises an assembly for loading capsule transport supports positioned in proximity to the inlet of the system for moving capsules, an assembly for unloading capsule transport supports positioned in proximity to the outlet of the system for moving capsules, and a device for transferring the capsule transport supports extending parallel to the sliding profiles along the same first predetermined axial direction and positioned between the assembly for loading and the assembly for unloading.

Thanks to this solution, the plant of the present invention allows a recirculation of the capsule transport supports inside the movement system without the need for an intervention by the operator.

According to another aspect of the present invention, the assembly for loading comprises an elevator, the assembly for unloading comprises a lowerator, the device for transferring the capsule transport supports comprises a conveyor belt.

According to another aspect of the present invention, the plant comprises operating stations being selectively associable to the system for moving capsules so as to modify the configuration of the plant for packaging.

Thanks to this solution, the plant for packaging can be rapidly modified for its intended use, transforming it from a plant for packaging substances in powder form, to a system for packaging liquid or pasty substances.

An additional aspect of the solution according to the present invention makes available a capsule transport support, particularly suited to be used in a plant for packaging capsules as defined above, the support comprising a main body elongated according to a second predetermined axial direction and particularly suited to be positioned on a pair of sliding profiles of a movement device of the plant for packaging capsules, characterised in that it comprises one or more housings of capsules distributed on the main body along said second axial direction, and a transport niche obtained on each end portion of the main body particularly suited to be engaged by drive pins of a movable frame of a system for moving capsules of the plant for packaging capsules. Thanks to this solution it is possible to transport with precision the capsules within the movement system and to modify the formation and/or the dimension of the capsules simply by replacing the capsule transport supports.

According to another aspect of the present invention, the support comprises at least one pair of centring sleeves in the lateral end portions of the main body along said second predetermined axial direction.

Thanks to this solution, it is possible to package a greater quantity of capsules without enlarging the overall bulk of the plant.

According to yet another aspect of the present invention, the support comprises an upper centring seat obtained on each of said end portions.

Thanks to this solution, it is possible to maintain the correct centring of a plurality of capsules with respect to an operating station and to allow the concurrent packaging of multiple capsules.

BRIEF DESCRIPTION OF THE DRAWINGS

Further features and advantages of the present invention will become apparent from the following description, given only by way of example, with reference to the accompanying figures, in which:

FIG. 4a is an isometric view of a godet according to the present invention;

FIG. 4b is a plan view of the godet of FIG. 4a;

FIG. 4c is a section view of the godet of FIG. 4a;

BEST EMBODIMENT OF THE INVENTION

Figure 1:
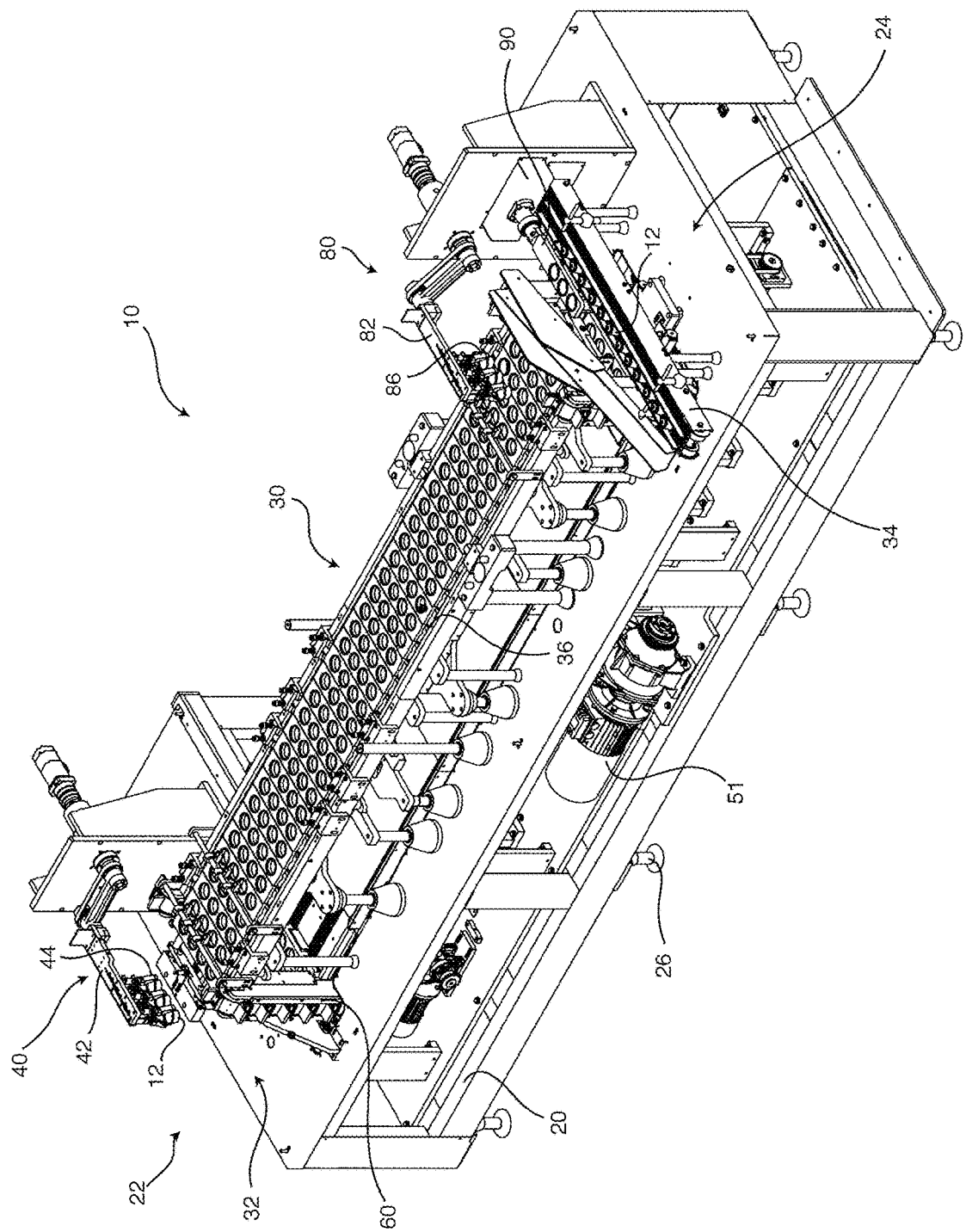
FIG. 1 is an isometric view of a plant according to the present invention without operating stations.
Figure 2:
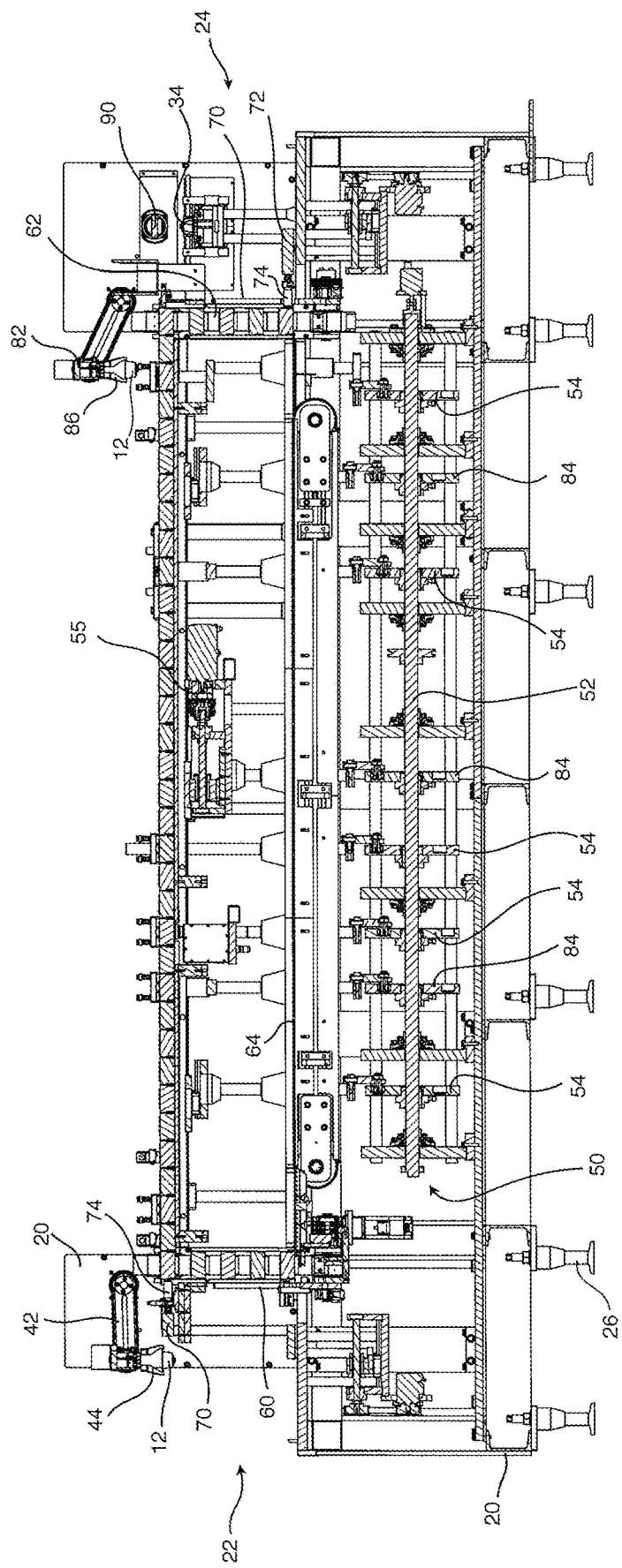
FIG. 2 is a view according to the section II-II of FIG. 3.

With reference to the accompanying figures, the plant for packaging capsules of the present invention 10 comprises a main frame 20, elongated according to a predetermined axial direction A-A, on which is positioned a system for moving capsules 30.

The system for moving capsules 30 comprises an inlet 22 and an outlet 24 of the capsules into and out of the system for moving capsules 30. The frame 20 is supported by a plurality of feet 26 distributed along the aforesaid axial direction A-A.

At the inlet of the capsules 22, the frame 20 comprises a loading area 32 where empty capsules 12 to be packaged are positioned. Naturally, the empty capsules 12 can be positioned in the loading area 32 according to any of the known systems. For example, but without limitation, it is possible to provide a conveyor belt (not illustrated) a first end whereof is positioned in the loading area 32 and a second end is positioned at an empty capsule magazine.

The system for moving capsules 30 comprises a device for loading capsules 40 fixed to the frame 20 in proximity to the inlet 22, for example of the "pick & place" type. In the embodiment shown in the figures, the device for loading capsules 40 comprises an arm 42 at a first end whereof are connected a plurality of gripping members, for example, a plurality of clamps 44. The arm 42 is connected at its opposite end to a movement system able to move, in use, the arm 42 from a first loading position in which the clamps 44 are positioned in proximity to the loading area 32 and each of them picks up a container 12, to a second unloading position in which the clamps 44 release said container 12.

The system for moving capsules 30 comprises a device for unloading capsules 80 fixed to the frame 20 in proximity to the outlet 24, for example of the "pick & place" type. In the embodiment shown in the figures, the device for unloading capsules 80 comprises an arm 82 at a first end whereof are connected a plurality of gripping members, for example, a plurality of clamps 86. The arm 82 is connected at its opposite end to a movement system able to move, in use, the arm 82 from a first loading position in which the clamps 86 are positioned in proximity to the unloading area 24 and each of them picks up a container 12, to a second unloading position in which the clamps 86 release said container 12.

Naturally, there may be different embodiments of the devices for loading 40 and unloading 80 the capsules 12 with respect to what is described and illustrated herein. A person skilled in the art will be capable of identifying a different device able to insert into the transport system 30 and pick up from the transport system 30 said capsules 12, without exercising any inventive effort and therefore without departing from the scope of the present invention. For example, but without limitation, it is possible to load the capsules 12 on the godets 100 manually, or by means of an unloading system comprising pneumatic cylinders or electric axes.

According to the illustrated embodiment, the plant for packaging comprises a conveying device, for example a conveyor belt 34, particularly suited to convey the capsules towards a subsequent operating station.

The system for moving capsules 30 comprises a movement device able to translate the capsules 12 from the inlet 22 to the outlet 24. According to the embodiment illustrated in the figures, the movement device consists of a conveyor that allows to translate one or more capsules with a fixed pitch, at constant time intervals, for example, but without limitation, a walking beam conveyor 50, 55.

According to a particularly advantageous characteristic of the present invention, the system for moving capsules 30 comprises a plurality of capsule transport supports, which in the industry are also called "godets".

With particular reference to FIGS. 4a, 4b, 4c a godet 100 according to the present invention comprises a main body with substantially parallelepiped shape, elongated according to a predetermined axial direction B-B. The godet 100 comprises at least one or more housings 102 distributed on the main body along said axial direction B-B and delimited by one or more inner walls 104.

In the illustrated embodiment, there are four housings 102 with cylindrical shape, but naturally a different number, dimension and shape of these housings 102 may be provided without thereby departing from the scope of the present invention.

The inner walls 104 of the housings 102 are shaped in such a way as to house a container 12 whose lateral and bottom walls have similar shape. In this way, a container 12 housed inside a housing 102 is maintained in place by interference between its lateral walls and the inner walls 104 of the housings 102.

The godet 100 can preferably be made of plastic material, and each housing 102 comprises an upper peripheral edge 106 on which is applied a metallic abutment 108, particularly suited, as will become clearer hereafter, to contrast a hot surface.

Naturally, it is possible to make the godet 100 with different materials and shapes so long as it comprises at least one housing 102 as described above.

The lateral ends of the main body of the godet 100 comprise an end portion 112. On the upper surface of the portions 112 is realised an upper centring seat 114, and in their lower portion is obtained a lower centring sleeve 116, both particularly useful, as will be clearer below, to check the positioning of the capsules 12 during the steps of dosing a substance inside the capsules, of weighing the capsules and of sealing a cap on a capsule. The upper centring seat 114 preferably comprises a pair of inclined surfaces 115.

According to another particularly advantageous feature of the present invention, on the lateral walls of the godet 100 are obtained one or more counterbores within each of which is positioned a bearing made of rubber or another elastomer 113. The bearing 113 is fixed to the godet 100 by means of a known mechanical blocking. This feature is particularly advantageous to reduce, in use, the noisiness of the godet 100 within the system for moving the capsules 30.

According to an additional feature of the present invention, on each end portion of the lateral walls of the godet 100 is obtained a transport niche 117.

With particular reference to FIGS. 2, 5, 6, 7 and 8, the movement system 30 comprises a movement device, for example, but without limitation, a walking beam conveyor 50, 55. The movement device is particularly suited in use to move the godet 100 from the inlet 22 to the outlet 24.

The movement device comprises a pair of sliding profiles 36 connected to the main frame 20 and extending from the inlet 22 to the outlet 24 along said axial direction A-A. On the sliding profiles 36 are positioned, in use, the godets 100 oriented transversely with respect to the axial direction A-A of the sliding profiles 36 so that the two lateral portions 112 of the godets 100 bear on said profiles 36.

In the illustrated embodiment, the movement system 30 comprises a main driveshaft 52 actuated by a known motor member 51.

The movement device further comprises a plurality of cams 84 mounted on the main driveshaft 52. To each cam 84 is connected a connecting rod 86. Each connecting rod 86 stands on a first movable frame comprising, for example, a lower movable beam 87, and an upper movable beam 88 connected in parallelogram manner by means of two vertical rods 89.

The movement device also comprises a driving member, or comb, positioned between the two sliding profiles 36. The comb comprises a base body 200 mounted slidable on the upper movable beam 88 of the first movable frame by means of a pair of skids 202. The base body 200 is connected to an actuator member 55, for example, a ball screw actuated by a motor 204, able to make the base body 200 translate on the skids 202 according to said predetermined axial direction A-A and, selectively, according to opposite directions, towards the inlet 22 or towards the outlet 24.

Figure 6:
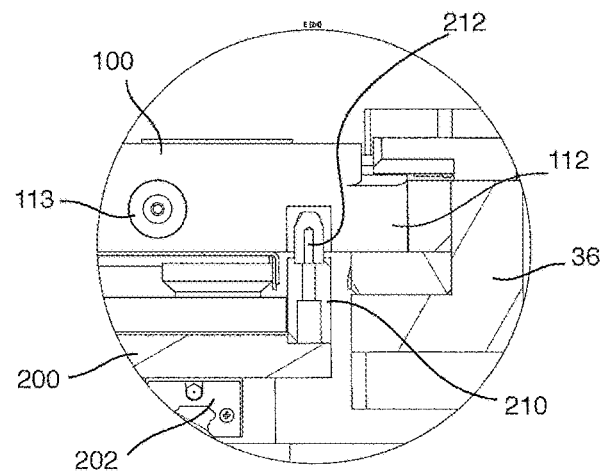
FIG. 6 is an enlarged view of a detail VI of FIG. 5.
Figure 7:
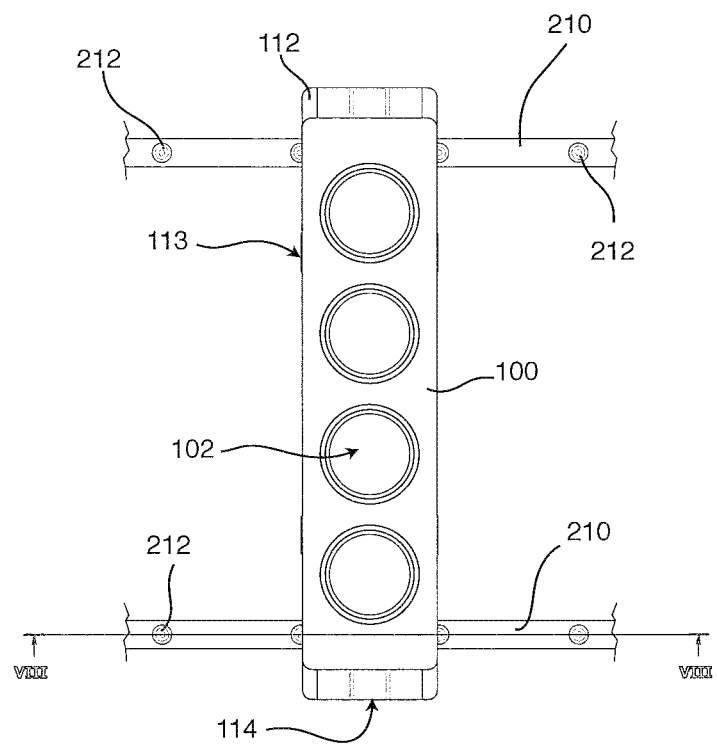
FIG. 7 is a plan view of a godet in an operating position thereof.
Figure 8:
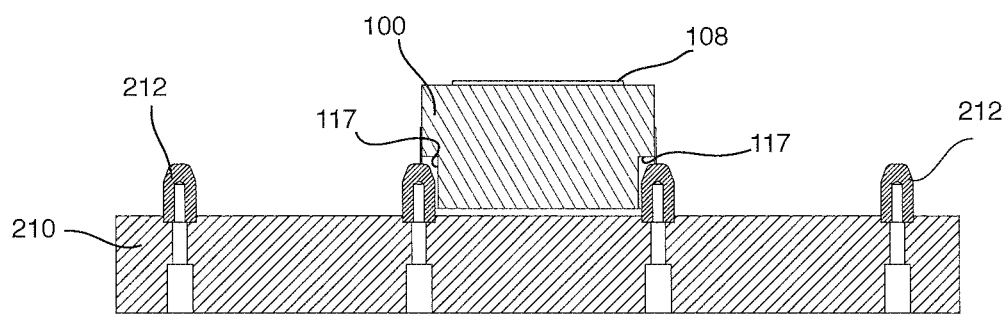
FIG. 8 is a view according to the section VIII-VIII of FIG. 7.
Figure 9:
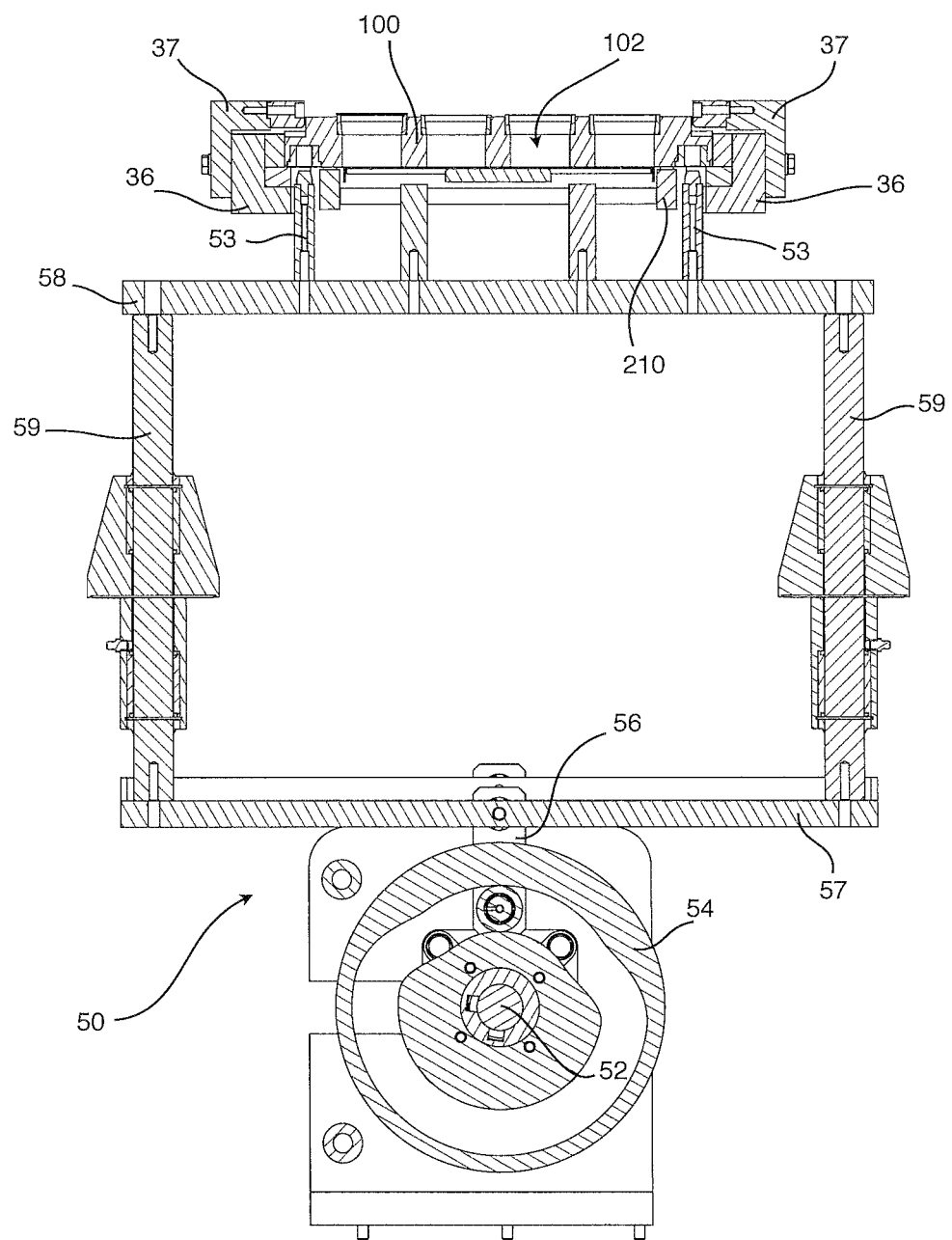
FIG. 9 is a section view of the centring device.
Figure 10:
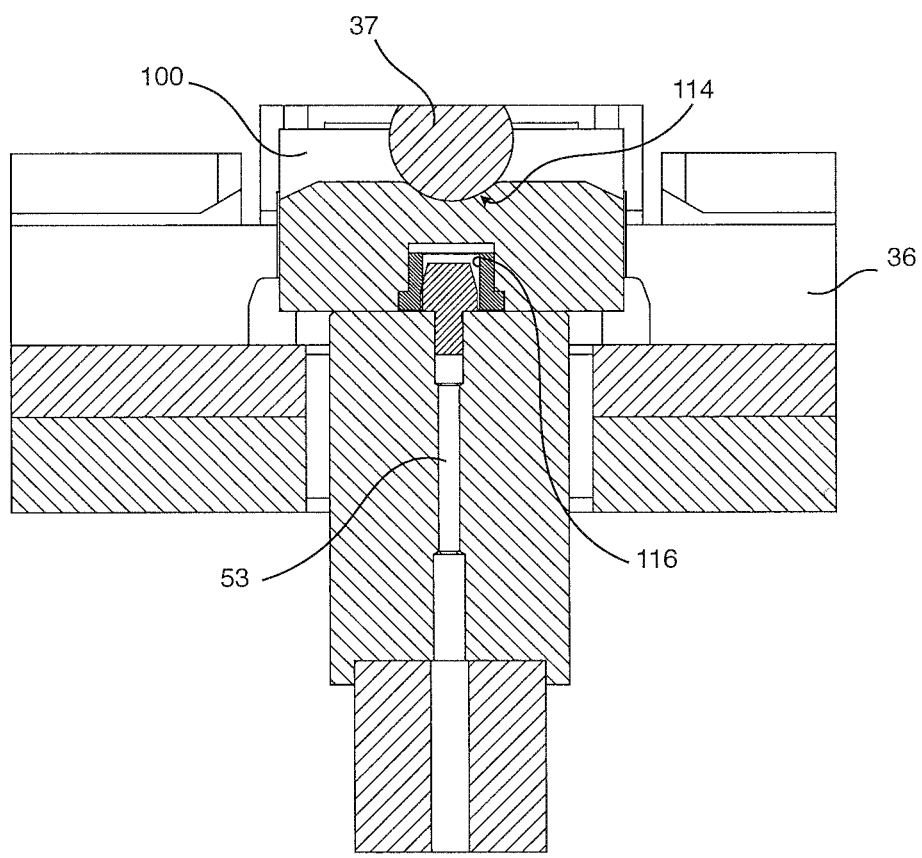
FIG. 10 is a sectioned isometric view of an upper and lower centring assembly of the godets.

As shown in FIG. 6, the driving member comprises a pair of crosspieces 210 connected laterally to the base body 200 and extending along the same predetermined axial direction A-A of the main frame 20. Each cross piece 210 comprises a plurality of drive pins 212 distributed distanced from each other so that between each pair of contiguous drive pins 212 it is possible to position a godet 100 and the drive pins 212 can be engaged to the transport niches 117 of the godet 100 in order to drive the godet 100, containing one or more capsules 12, along said predetermined axial direction A-A. The movement system 30 of the present invention also comprises a centring device, particularly suited to centre the godets 100 at operating stations present in the plant, for example an arrangement for dosing liquids/solids, a weighing station, an arrangement for cleaning after dosing, a sealing and shearing arrangement.

The centring device comprises a plurality of cams 54 mounted on the driveshaft 52 of the movement device. To each cam 54 is connected a connecting rod 56. The connecting rods 56 stand on a second movable frame, for example, a lower centring beam 57, an upper centring beam 58 connected in parallelogram manner by means of two vertical rods 59.

The centring device comprises a lower centring assembly and an upper centring assembly.

The lower centring assembly comprises a plurality of centring pins 53 connected to each upper centring beam 58, such pins being particularly suited to be inserted in the centring sleeves 116 of the godet 100. The upper centring assembly comprises a plurality of upper centring abutments 37 connected to the sliding profiles 36, and positioned at the cams 54 of the centring device, particularly suited to abut against the centring seat 114 of the godets 100.

According to a particularly advantageous feature of the present invention, the cams 84 of the movement device and the cams 54 of the centring device are mounted in opposition on the main driveshaft 52, so that the vertical movements of the two movable members of the two devices cannot take place concurrently.

In use, a first rotation, of predetermined amplitude, of the main driveshaft 52, and of the cams 84, lifts the crosspieces 210 engaging the drive pins 210 to the transport niches 117 of the godets 100 positioned on the sliding profiles 36. Then, the ball screw actuated by the motor 204 translates the crosspieces 210 from an initial position to a final position towards the outlet 24 along the predetermined axial direction A-A, causing the translation of the godets 100 towards the outlet 24.

A second rotation, of predetermined amplitude, of the main driveshaft 52, and of the cams 84, lowers the crosspieces 210 disengaging the drive pins 210 to the transport niches 117 of the godets. Then the ball screw actuated by the motor 204 translates the crosspieces 210 from the final position towards the inlet 22 along the predetermined axial direction A-A, bringing the crosspieces 210 in their initial position. Repeating the two steps described above, it is possible to translate the godets 100 from the inlet 22 to the outlet 24 of the movement system 30.

Similarly, since the cams 54 are mounted in opposition on the main driveshaft 52, the first rotation, of predetermined amplitude, lowers the upper centring beam 58 moving the centring pins 53 away from the godets 100.

The second rotation, of predetermined amplitude, of the main driveshaft 52, and of the cams 54, lifts the upper centring beam 58 allowing the centring pins 53 to be inserted in the centring sleeves 116 of the godet 100 and lifting, with respect to the sliding profiles 36, the godet 100 that is at an operating station of the plant for packaging 10. Concurrently, the centring seat 114 of the godet 100 abuts against the upper abutment 37 of the sliding profiles assuring the correct centring of the godet 100 with respect to the operating station. This configuration also allows to fasten, and to maintain stable, the godet 100 between the centring pins 53 and the upper abutment 37.

Figure 3:
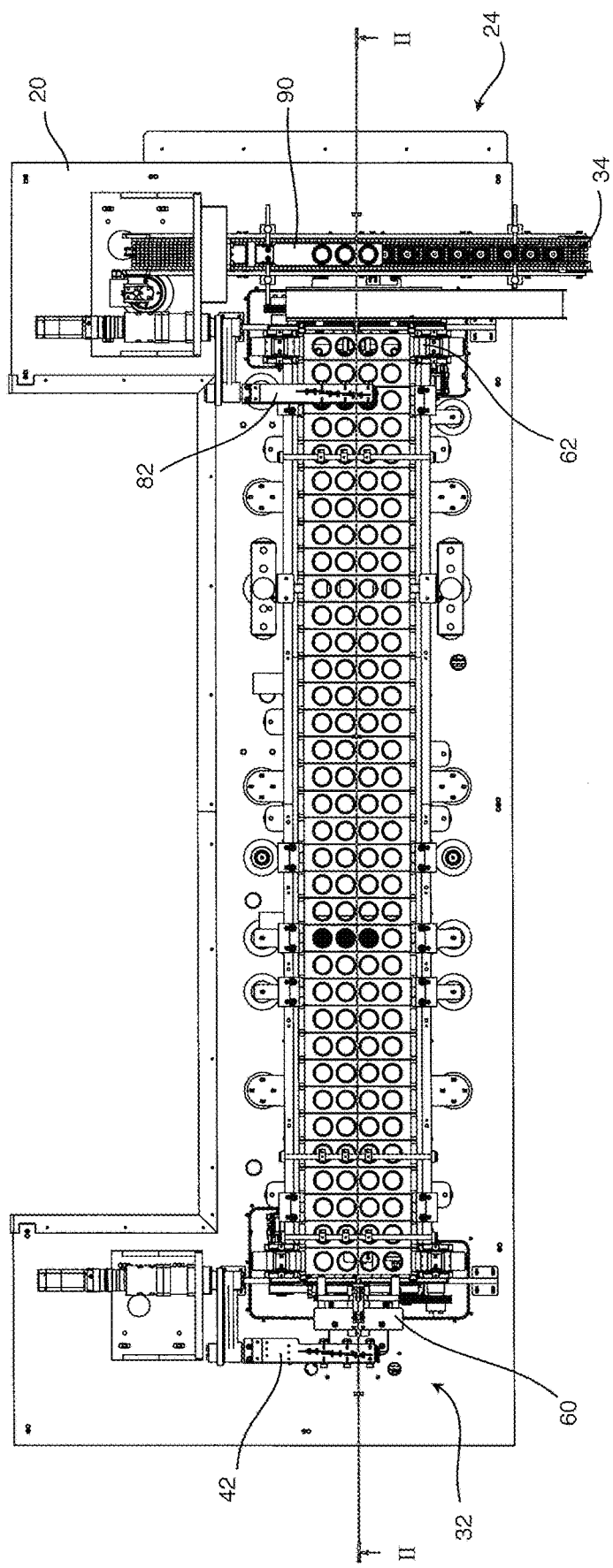
FIG. 3 is a plan view of the plant of FIG. 1.
Figure 5:
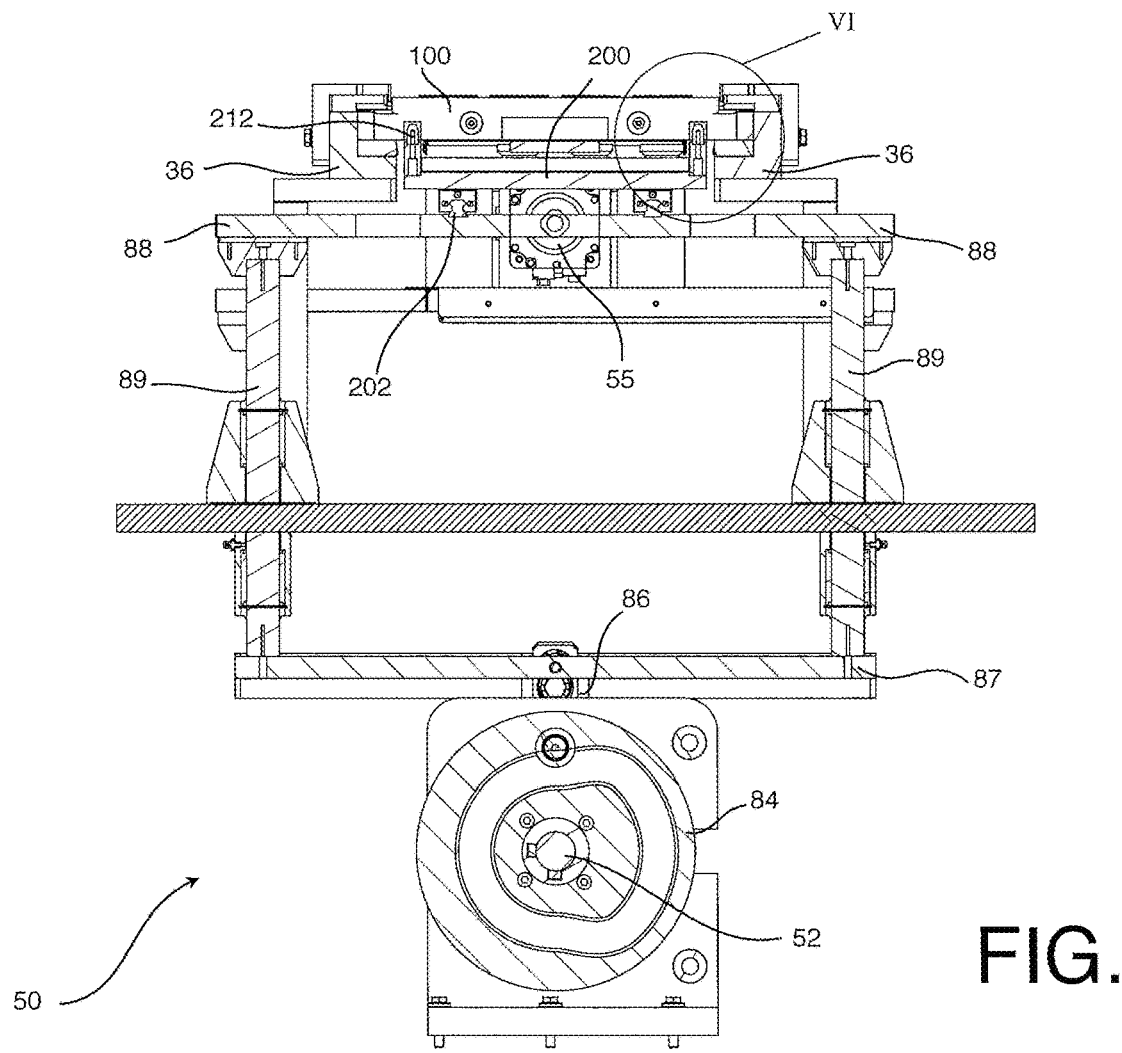
FIG. 5 is a section view of the walking beam moving device.

Again with reference to FIGS. 1 and 3, the movement system further comprises an assembly for loading and an assembly for unloading the godets 100. In the illustrated embodiment, the assembly for loading comprises an elevator 60 with vertical toothed belt positioned at the inlet of the capsules 22, and the assembly for unloading the godets 100 comprises a lowerator 62 with vertical toothed belt positioned at the outlet of the capsules 24. A device for transferring the godets, for example, a conveyor belt 64, extends parallel to the sliding profiles 36 and along the same axial direction of the movement device. The conveyor belt 64 is positioned inferiorly with respect to the sliding profiles 36 and between the lower ends of the elevator 60 and of the lowerator 62. The conveyor belt 64 is particularly suited to move the godets 100 from the outlet 24 to the inlet 22 of the movement system 30, along the same predetermined axial direction A-A but in the opposite direction with respect to the movement of the godets 100 along the sliding profiles 36.

According to this configuration, the elevator 60, the sliding profiles 36, the lowerator 62 and the conveyor belt 64 define a closed loop path along which are moved the godets 100. The godets 100 are filled with capsules 12 in proximity to the inlet 22, transported by the walking beam conveyor 50 to the outlet 24, transferred by the lowerator 62 along the conveyor belt 64, transferred towards the inlet 22 by the conveyor belt 64 and again arranged in loading position by the elevator 60.

The assembly for loading the godets further comprises a thruster 70 positioned in proximity to the upper end of the elevator 60, and aligned with the sliding slides of the movement system 30. The assembly for unloading the godets comprises a thruster 72 positioned in proximity to the lower end of the lowerator 62 and aligned with the conveyor belt 64. Both thrusters 70, 72 comprise a thrust rod 74 actuated in horizontal translation by means of an actuator, for example a hydraulic piston or another known device.

According to one of the embodiments of the present invention, the assembly for unloading the godets 100 can further comprise an arrangement for rotating the capsules 90. The rotating arrangement 90 is positioned in proximity to the conveyor belt 34 and it is particularly suited, in use, to rotate the capsules 12 picked up by the arm 82 of the device for loading capsules 80 with respect to an axis thereof. For example, the rotation arrangement comprises a rod elongated along a longitudinal axis and whereon are obtained a plurality of housings particularly suited to house the capsules. The rod is connected to a rotor shaft engaged to the main frame 20.

Naturally a person skilled in the art could easily identify a different embodiment of the known capsule rotating arrangement 90 without thereby departing from the scope of protection of the present invention. Similarly, it is possible to provide an embodiment of the present invention without a capsule rotating arrangement.

In use, a plurality of capsules 12 is positioned in the loading area 32 and the elevator 60 positioned a godet 100 at the sliding profiles 36. Then the thruster 70 thrusts the godet 100 on the sliding sides 36, the device for loading capsules 40 picks up the capsules 12 by means of the arm 42 and the clamps 44, and deposits the capsules 12 inside the housings 102. These phases are repeated at each step of the machine until the end of production.

As indicated above, different embodiments of the loading devices may be provided. Similarly, it is possible to provide different steps of loading the capsules 12 inside the godet 100 without thereby departing from the scope of the present invention.

Thanks to the movement offered by the walking beam conveyor, i.e. a translation of the godets 100 by a fixed pitch, at constant time intervals, along the path of movement of the godets it is possible to associate one or more operating stations able to fill the capsules with a substance, to close the opening of the capsule with a film, sealing and shearing the film.

When the capsule 12 reaches the outlet 24, the device for unloading capsules 80 picks up the packaged capsules 12 by means of the arm 82 and the clamp 86 and deposits them on the capsule rotating arrangement 90, which, in turn, rotating the rod around its longitudinal axis, deposits the rotated capsules 12 on the conveyor belt 34.

The empty godet 100 is lowered by the lowerator 62 and towards the conveyor belt 64, the thruster 72 thrusts it on the conveyor belt 64 that conveys the empty godet 100 towards the elevator 60 in proximity to the inlet 22. The elevator 60 lifts the empty godet 100 until bringing it at the sliding profiles to be moved again by the thruster 70 on the system for moving capsules 30 to then be subsequently loaded with the empty capsules 12 by the loading arrangement 42 operating with the clamp 44.

According to an additional embodiment of the present invention, the system for moving and packaging capsules comprises a plurality of operating stations selectively associated to the system for moving capsules 30.

For example, the system can comprise at least one station for sealing a covering element on the opening of the capsule and subsequent shearing 200.

According to a particularly advantageous feature of the present invention, these stations are movable with respect to the system for moving capsules 30 so as to be able to be moved farther or closer according to production needs and/or in case of replacement. The operating stations are mounted on a moving equipment, for example, but without limitation, on a mechanical frame provided with wheels or rollers able to support and move said operating stations, preferably a carriage 310.

To allow a correct positioning of the operating stations, and to assure their selective fixing to the movement system, the present invention comprises a centring and fixing system illustrated in FIGS. 11 and 12, and described below.

The sealing and shearing station 200 comprises a frame 210 to which is fixed a sealing and shearing machine 220.

The centring and fixing system 300 comprises a carriage 310 consisting of a base 320 on which are fastened a plurality of wheels 312 that allow the displacement of the system itself. The carriage 310 comprises a vertical upright 330 connected to the base 320.

On the vertical upright 330 is fastened a guide 332 on which is operatively connected a slidable slide, for example a ball runner block 334. An actuator, for example a handwheel 336 is positioned on the upper end of the guide 332 and connected to the ball runner block 334 to allow, in use, its movement along the guide 332. To the skid 334 is fixed a plate 337, comprising a plurality of centring pins 338.

The centring and fixing system 300 further comprises a centring block 440, engaged to the slide 334 and fastened, in use, to the frame 20 of the plant 10. The centring block 440 comprises a plurality of housings, for example tempered saddles 442, particularly suited to house the centring pins 338 of the plate 337.

In use, the carriage 310 is approached to the sealing and shearing station 200, and aligned by coupling the centring pins 338 inside the saddles 442. To facilitate alignment, the slide 334, and hence the plate 337, are raised or lowered by means of the handwheel 336.

Then the carriage 310 is in correct position with respect to the godets 100 positioned on the system for moving capsules 30.

Figure 11:
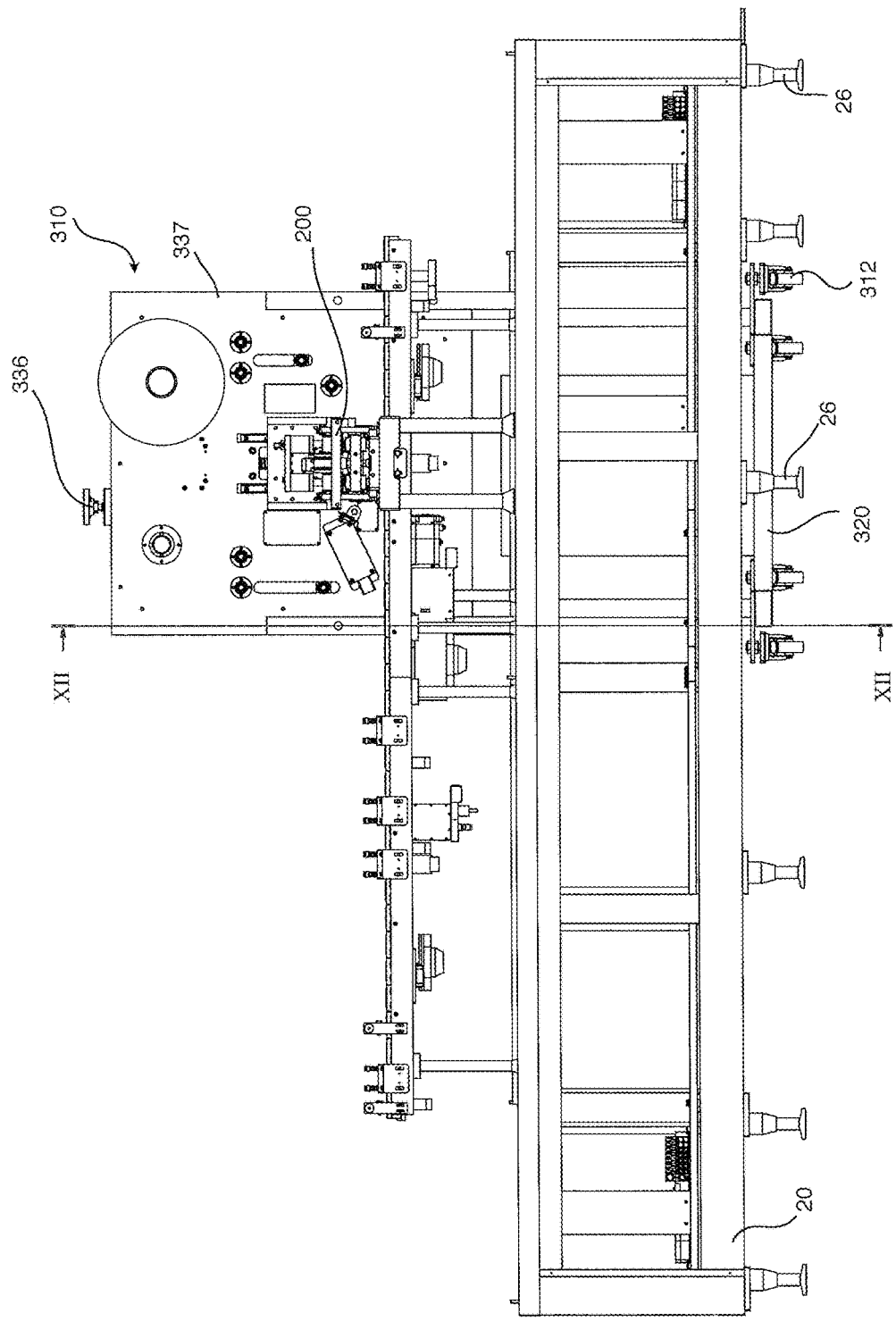
FIG. 11 is a front view of a centring and fixing system of a machine for shearing and sealing the flexible closing lid of the capsule according to the present invention.
Figure 12:
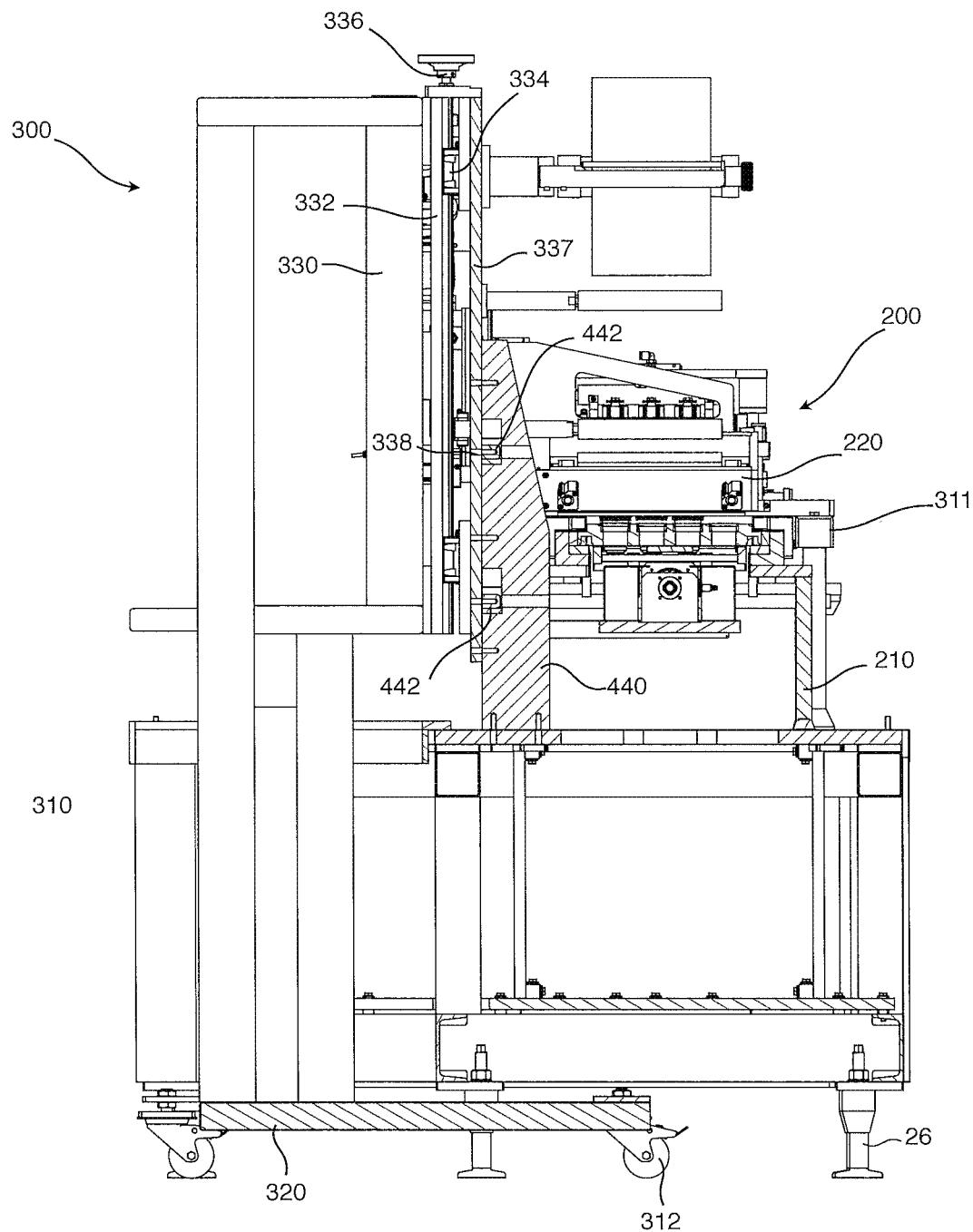
FIG. 12 is a view according to the section XII-XII of FIG. 11.

It is specified that in the embodiment of FIGS. 11 and 12, a sealing and shearing station is shown by way of example, but the centring and fastening system can also be applied to different types of operating stations.

Figure 13:
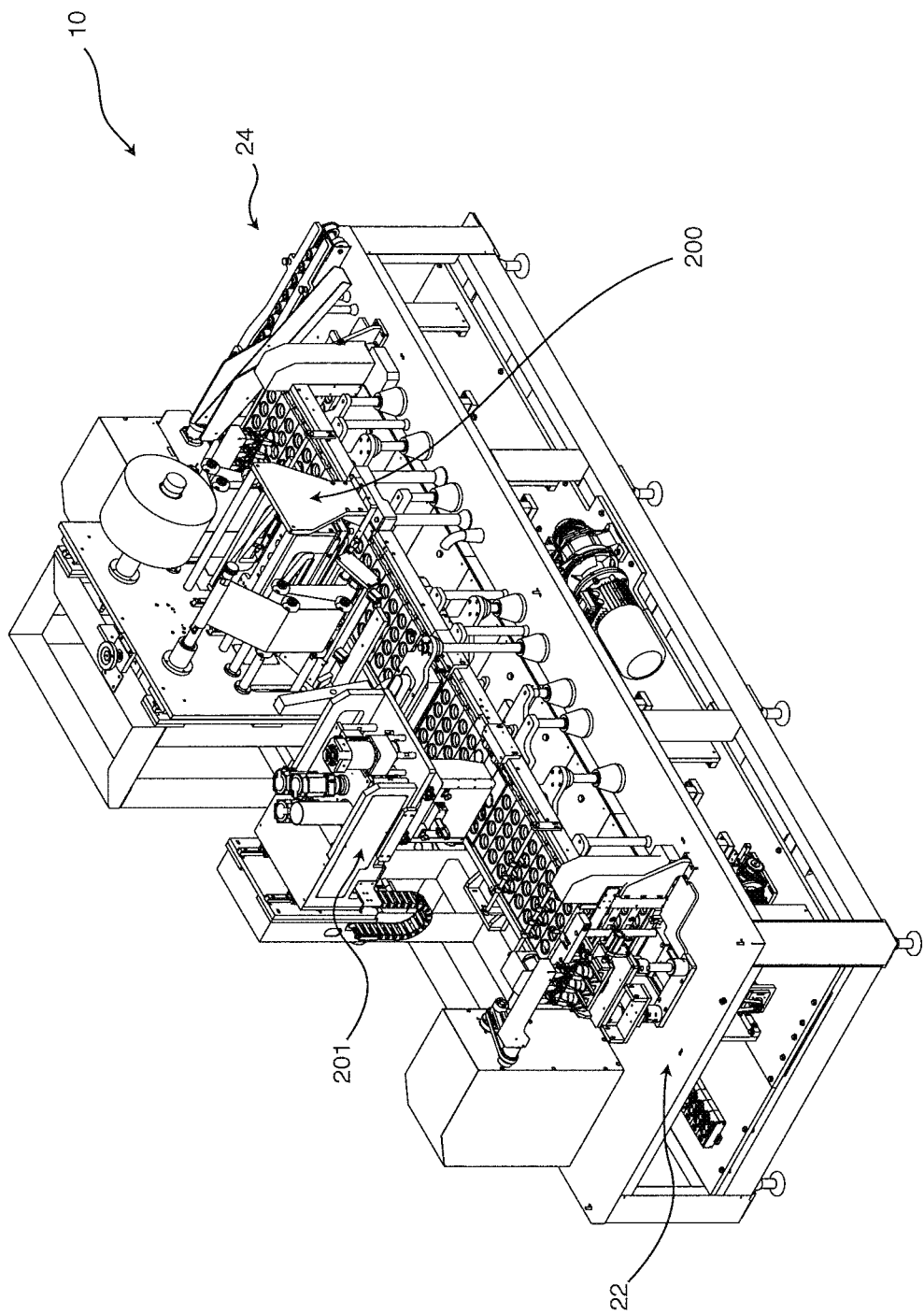
FIG. 13 is an isometric view of one of the embodiments of the present invention in which the plant comprises a dosing machine for solid or lyophilized products and a shearing and closing machine.
Figure 14:
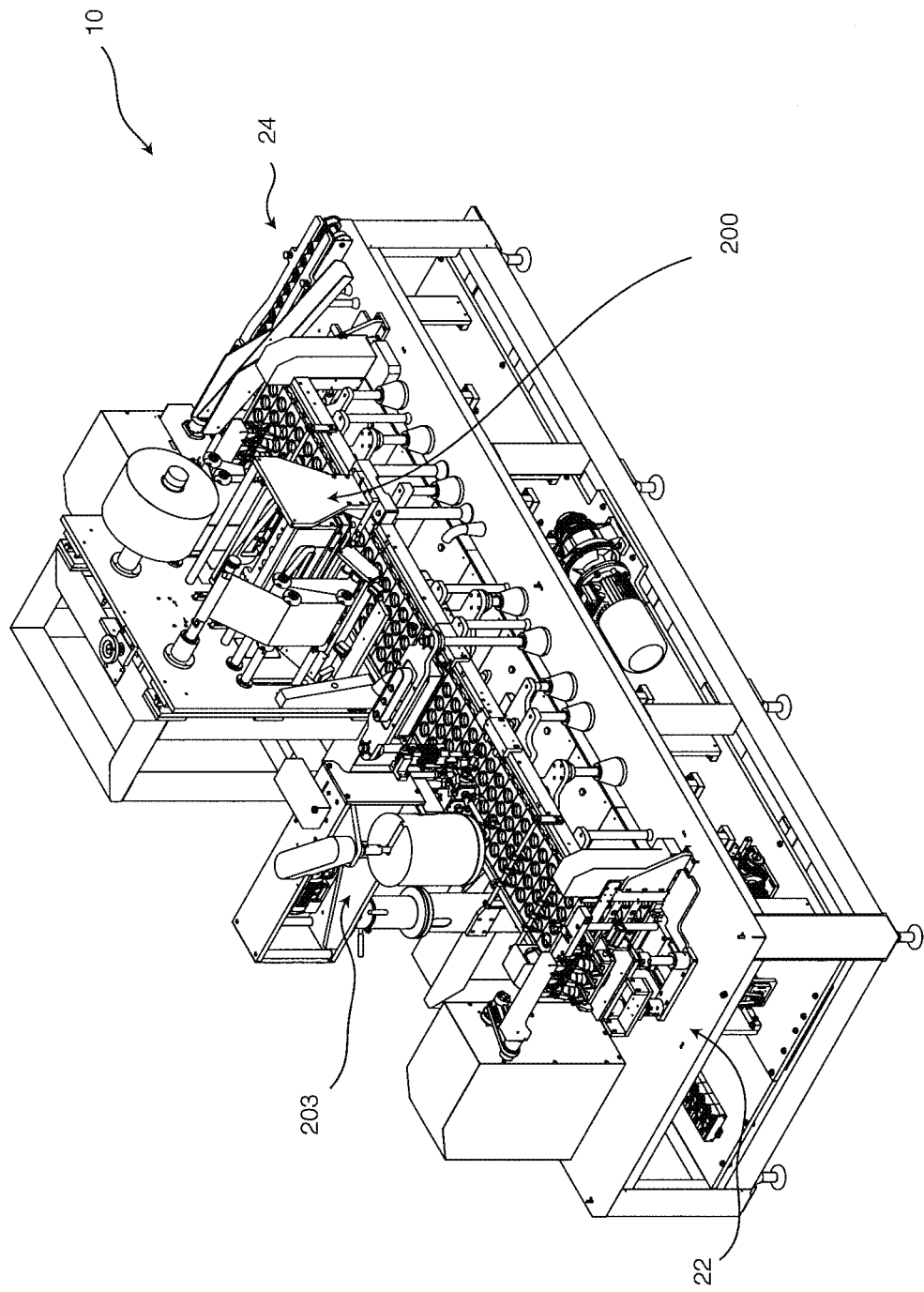
FIG. 14 is an isometric view of an additional embodiment of the present invention in which the plant comprises a dosing machine for liquid products and a shearing and closing machine.

In FIGS. 13 and 14, by way of example, are shown some embodiments of the present invention in which the plant for packaging capsules 10 is associated respectively to a dosing machine for solid or lyophilised products 201 and a shearing and closing machine 200 in FIG. 13, and to a dosing machine for liquid products 203 and a shearing and closing machine 200 in FIG. 14.

The system for moving capsules 30 further comprises a plurality of supports 311, particularly suited, in use, to anchor selectively an operating station, for example the sealing and shearing arrangement 200, and/or an element integral with the centring and fastening system 300.

The selective anchoring can be carried out, for example, but without limitation, with the aid of electromagnets or of any other known mechanical anchoring system.

All details can be replaced with other technically equivalent elements. Similarly, the materials used, as well as their shapes and dimensions, can be of any type according to the technical requirements without thereby departing from the scope of protection of the following claims.

The invention claimed is:

1. A plant for packaging capsules comprising a main frame on which is positioned a system for moving capsules to make one or more capsules advance along a first predetermined axial direction from an inlet to an outlet, the plant comprises a plurality of operating stations for packaging a substance into a plurality of capsules, the system for moving capsules comprises a movement device that comprises:
    a pair of sliding profiles that extend along said first predetermined axial direction and are connected to the main frame,
    a first movable frame movable in transverse direction with respect to the first predetermined axial direction,
    a driving member mounted slidable on an upper movable beam of the first movable frame along said predetermined axial direction and positioned between the pair of sliding profiles,
    said driving member comprising a plurality of drive pins particularly suited to drive a capsule transport support containing said one or more capsules,
    the system for moving capsules comprises a centring device that comprises a lower centring assembly connected to a second movable frame movable in transverse direction with respect to the first predetermined axial direction, and an upper centring assembly connected to the sliding profiles,
    the second movable frame of the centring device and the first movable frame of the movement device are both mounted in opposition on a main driveshaft through a respective cam and a respective connecting rod.

2. The plant according to claim 1, wherein the lower centring assembly comprises a plurality of centring pins connected to an upper centring beam of the second movable frame, said centring pins being particularly suited to be inserted in centring sleeves of a capsule transport support.

3. The plant according to claim 2, wherein the upper centring assembly comprises a plurality of upper centring abutments connected to the sliding profiles, and configured to abut against a centring seat of a capsule transport support.

4. The plant according to claim 3, wherein the system for moving capsules comprises an loading assembly for loading capsule transport supports positioned in proximity to the inlet of the system for moving capsules, an unloading assembly for unloading capsule transport supports positioned in proximity to the outlet of the system for moving capsules, and a transferring device for transferring the capsule transport supports extending parallel to the sliding profiles along the same first predetermined axial direction and positioned between the loading assembly and the unloading assembly.

5. The plant according to claim 4, wherein the loading assembly comprises an elevator, the unloading assembly comprises a lowerator, the transferring device for transferring the capsule transport supports comprises a conveyor belt.

6. The plant according to claim 1, wherein said operating stations being selectively associable to the system for moving capsules to be able to modify the configuration of the plant for packaging.

7. The plant according to claim 1, wherein the capsule transport support comprises a main body elongated according to a predetermined second axial direction transverse with respect to the first axial direction and positioned on the pair of sliding profiles, wherein the capsule transport support comprises one or more housings of capsules distributed on the main body along said second axial direction, and a transport niche obtained on each end portion of the main body particularly suited to be engaged by the drive pins.

8. The plant according to claim 7, wherein the capsule transport support comprises at least one pair of centring sleeves in the lateral end portions of the main body along said predetermined second axial direction.

9. The plant according to claim 8, wherein the capsule transport support comprises an upper centring seat obtained on each of said end portions.

10. A plant for packaging capsules comprising a main frame on which is positioned a system for moving capsules to make one or more capsules advance along a first predetermined axial direction from an inlet to an outlet, the plant comprises a plurality of operating stations for packaging a substance into a plurality of capsules, wherein the system for moving capsules comprises a walking beam conveyor that comprises:
- a pair of sliding profiles that extend along said first predetermined axial direction and are connected to the main frame,
- a capsule transport support comprising a main body elongated according to a predetermined second axial direction transverse with respect to the first axial direction and positioned on the pair of sliding profiles in a replaceable manner,
- a first movable frame movable in transverse direction with respect to the first predetermined axial direction,
- a driving member mounted slidable on an upper movable beam of the first movable frame along said predetermined axial direction and positioned between the pair of sliding profiles, said driving member comprising a plurality of drive pins particularly suited to drive a capsule transport support containing said one or more capsules, wherein the capsule transport support comprises one or more housings of capsules distributed on the main body along said second axial direction, and a transport niche obtained on each end portion of the main body engageable by the drive pins.

11. The plant for packaging capsules comprising a main frame on which is positioned a system for moving capsules to make one or more capsules advance along a first predetermined axial direction from an inlet to an outlet, wherein the plant comprises:
- a plurality of operating stations for packaging a substance into a plurality of capsules, said operating stations being selectively associable to the system for moving capsules to be able to modify the configuration of the plant for packaging,
- wherein each of the operating stations is mounted on a mechanical frame provided with wheels or rollers able to support and move each operating station with respect to the system for moving capsules, so as to be able to be moved away or close to the system for moving capsules;
- a centring and fixing system configured to allow a correct positioning of each of the operating stations with respect to the system for moving capsules and to allow a selective anchoring of each of the operating stations to the system for moving capsules, wherein the centring and fixing system comprises a plurality of supports equipped with electromagnets configured to selectively anchor each of the operating stations to the to the system for moving capsules.

* * * * *